United States Patent [19]

Tachibana

[11] Patent Number: 5,463,890
[45] Date of Patent: Nov. 7, 1995

[54] AUTOMATIC BENDING APPARATUS AND MARKING DEVICE FOR BAND-SHAPED WORK

[75] Inventor: Hiroshi Tachibana, Tokyo, Japan

[73] Assignee: Kabushiki Kaisha Tachibana Seisakusho, Tokyo, Japan

[21] Appl. No.: 320,832

[22] Filed: Oct. 7, 1994

Related U.S. Application Data

[63] Continuation of Ser. No. 65,911, May 25, 1993, abandoned.

[30] Foreign Application Priority Data

| May 29, 1992 | [JP] | Japan | 4-163891 |
| Apr. 27, 1993 | [JP] | Japan | 5-125101 |

[51] Int. Cl.⁶ ............................................. B21D 5/01
[52] U.S. Cl. ........................... 72/294; 72/307; 72/310
[58] Field of Search ........................... 72/294, 307, 308, 72/310, 311, 323, 320, 388, 387, 217–219

[56] References Cited

U.S. PATENT DOCUMENTS 3,845,650  11/1974  Romanov ................................. 72/310
3,880,028  4/1975  Frederick .................................. 83/74

FOREIGN PATENT DOCUMENTS

| 584364 | 9/1933 | Germany | 72/310 |
| 610339 | 10/1960 | Italy | 72/310 |
| 63-309328 | 12/1988 | Japan . | |

Primary Examiner—Daniel C. Crane
Attorney, Agent, or Firm—Ronald R. Snider

[57] ABSTRACT

An automatic bending apparatus for bending a band-shaped work at a plurality of positions in sequence with intermittent feed of the work in a longitudinal direction thereof. The bending apparatus includes a swingable work holder for holding the work and a fixed bending jig for bending the work in cooperation with the work holder. The work projecting from an outlet of a passage formed in the holder is pressed against the jig by swinging the holder to approach it toward the jig. After bending the work, the holder is returned to a neutral position, and the work is fed to be projected from the outlet, then repeating the above operation. In marking the work with a cutter, a cutting sound detecting device such as a microphone is provided to detect whether the cutter has come into contact with the edge of the work. Further, a depth of cutting from the edge of the work is controlled to be constant on the basis of a timing of detection of the cutting sound.

13 Claims, 14 Drawing Sheets

AUTOMATIC BENDING APPARATUS AND MARKING DEVICE FOR BAND-SHAPED WORK

This application is a continuation of application Ser. No. 08/065,911, filed May 25, 1993, now abandoned.

BACKGROUND OF THE INVENTION

The present invention relates to an apparatus for automatically bending a band-shaped work made of metal or the like into a desired form, and also relates to a device for making a notch mark on a longitudinal edge of such a work.

Referring to FIG. 20, there is shown a known punching die 202 consisting of a base plate 201 made of wood and a track-shaped band knife 200 embedded so as to project from one surface of the base plate 201. The punching die 202 is used to punch a plate or sheet of various materials (e.g., plywood, leather, paper, cloth, and plastic board) into a desired form or form a cut line on such a plate or sheet with a desired form. That is, the punching die 202 is lowered onto such a plate or sheet to effect punching or cutting.

Such a band knife is formed by bending a linear band-shaped work into a desired shape by using a bending apparatus, an example of which is disclosed in Japanese Patent Laid-open Publication No. 63-309328. The prior art bending apparatus will be described with reference to FIG. 21.

As shown in FIG. 21, a band-shaped work w is fed in a longitudinal direction thereof by a pair of feed rollers a and pass through a fixed holder b along a slit formed therein to project from an outlet of the slit. A bending member c is movably provided in the vicinity of the outlet of the slit of the holder b so as to be moved along an arcuate locus A—A. The bending member c is mounted inside of an annular gear, for example, adapted to be driven by a motor. Accordingly, when the annular gear is driven by the motor, the bending member c is moved with a given stroke H along the arcuate locus A—A to press a portion $P_1$ of the work w against a forming edge d of the holder b, thereby bending the work w at the portion $P_1$ at a desired angle. Thereafter, the bending member c is returned to an original position, and the work w is advanced a predetermined distance D by the feed rollers a. Then, the bending member c is driven again to press a portion $P_2$ of the work w in the same manner as the above to thereby bend the work w at the portion $P_2$. Subsequently, such a bending operation is similarly repeated to obtain an approximately arcuate bent portion of the work w, for example.

However, the prior art bending apparatus has the following drawbacks. First, in the case of replacing the bending member c, the replacement is hard or very troublesome. The replacement of the bending member c is necessary in the case of using another bending member having a bending point different in shape from that of the bending member c in accordance with a shape of bend of the work w, or in the case of wearing or breaking of the bending member c. As the bending member c is fixed to the inside of an annular rotating body in general, it is necessary to disassemble a rotary mechanism, so as to replace the bending member c, thus requiring a troublesome work. Secondly, the bending member c is retained to the rotating body so as to be reciprocated near the front end of the holder b. However, since it is necessary to mount the rotating body so that it does not interfere with the holder b, thus requiring a special design to cause a complicated structure.

Further, in some cases, the band-shaped work is marked on a longitudinal edge thereof to indicate a reference position for an after-working. That is, in the case of punching the work after bending it with use of the bending apparatus or in the case of manually bending the work into a special shape difficult to obtain with use of the bending apparatus, such a punching or manual bending operation is performed on the basis of the mark after the bending operation by the automatic bending apparatus. The mark may be made by applying a paint or the like to the work. In this case, however, there is a possibility that the mark will disappear before the after-working or a position accuracy of the mark will be insufficient.

SUMMARY OF THE INVENTION

It is accordingly a first object of the present invention to provide an automatic bending apparatus in which a bending jig can be easily replaced and a structure can be simplified.

It is a second object of the present invention to provide an automatic bending apparatus which can reliably mark a work with a high positional accuracy.

It is a third object of the present invention to provide an automatic bending apparatus or a marking device which can make a notch mark on the work with a fixed depth irrespective of a curve of the work.

The automatic bending apparatus achieving the first object of the present invention includes a movable work holder for holding a band-shaped work and a fixed bending jig against which the work held by the movable work holder is pressed to thereby bend the work. The holder has a passage for permitting passing of the work, and the work is projected from an outlet of the passage. Accordingly, a projecting portion of the work projecting from the outlet of the passage is pressed against the jig by moving the holder toward the jig, thereby effecting bending of the work. While the movable work holder may be a linearly reciprocatable holder, it is preferably a rotatable holder adapted to be swung about an axis in a given angular range from the viewpoint of simplicity of a drive mechanism. Such a rotatable work holder is driven by a motor, for example. The bending apparatus further includes a work feeding device for intermittently feeding the work in the longitudinal direction thereof to project the work from the outlet of the passage of the movable work holder.

The fixed bending jig is preferably constituted of a first jig for bending the work in a first direction and a second jig for bending the work in a second direction opposite to the first direction. The first and second jigs are preferably fixed on a movable base at the positions offset from each other, so as to prevent interference of the work with one of the first and second jigs in bending the work with use of the other jig. Accordingly, either the first jig or the second jig can be selectively opposed to the work by moving the movable base. Further, a pair of cutting members for cutting the work may be mounted on the movable base at a position offset from the first and second Jigs. Accordingly, one of the first jig, the second jig, and the pair of cutting members can be selectively opposed to the work by moving the movable base. Further, the fixed bending jig may be constructed in a hollow structure having an opening, so as to permit a previously bent portion of the work to come into the opening in the course of approach of the holder to the jig, thereby preventing interference between the work and the jig.

The automatic bending apparatus achieving the second object of the present invention further includes means for notching an edge of the work extending in the longitudinal direction thereof and means for providing relative movement between the notching means and the work so that the notching means and the work are relatively moved toward and away from each other. The notching means is preferably constructed of a thin disk-shaped rotating cutter, and the relative movement providing means is preferably constructed of an actuator for moving the notching means relative to the work.

Such a marking operation is performed as shown in FIG. 5, for example. That is, a rotating cutter C is lifted with a predetermined stroke to make a notch mark m on a lower edge of a band-shaped work W. On the basis of this notched mark m, punching, manual bending, etc. of the work W are carried out in the subsequent stage. However, if the work W has an upward curve in the width direction thereof as shown in FIG. 17, the rotating cutter C will not come into contact with the lower edge of the work W to result in no mark on the work W. Conversely, if the work W has a downward curve in the width direction thereof as shown in FIG. 18, the rotating cutter C will excessively cut into the lower edge of the work W to result in an excessive depth of the notched mark m. While the case shown in FIG. 17 causes a serial problem as a matter of course, the case shown in FIG. 18 also causes a problem such that the work W will be readily sharply bent at the deep mark m in the subsequent manual bending operation as shown in FIG. 19.

The automatic bending apparatus achieving the third object of the present invention, i.e., solving the above problems, further includes a cutting sound detecting device for detecting a cutting sound generating in making the notched mark on the work and control means for controlling the relative movement providing means so as to obtain a fixed depth of cutting of the work according to an output signal from the cutting sound detecting device. The cutting sound detecting device is preferably constructed as a microphone. The control means preferably comprises a filter for removing any noises other than the cutting sound detected by the microphone, an integrator for integrating an output waveform from the filter during a certain short period of time for the purpose of clear distinction of the cutting sound from any residual noise, means for determining whether an output from the integrator is greater than a predetermined threshold to reliably detect the contact of the rotating cutter with the work, and means for setting the cutting depth on the basis of a timing of receipt of an output signal from the determining means. For example, when the output signal from the determining means is generated, a predetermined time is set in a timer. Then, at the timing when the predetermined time has elapsed, the feed of the rotating cutter is stopped. Alternatively, the number of revolutions or pulses of a feed motor for feeding the rotating cutter may be counted after detection of the contact of the rotating cutter with the work, and when the counted value reaches a preset value, the feed of the rotating cutter may be stopped.

Such a marking technique employing the cutting sound detecting device is applied not only in combination with the automatic bending apparatus but also solely as independent of the automatic bending apparatus.

Other objects and features of the invention will be more fully understood from the following detailed description and appended claims when taken with the accompanying drawings.

DETAILED DESCRIPTION OF THE PREFERRED EMBODIMENTS

Figure 1:
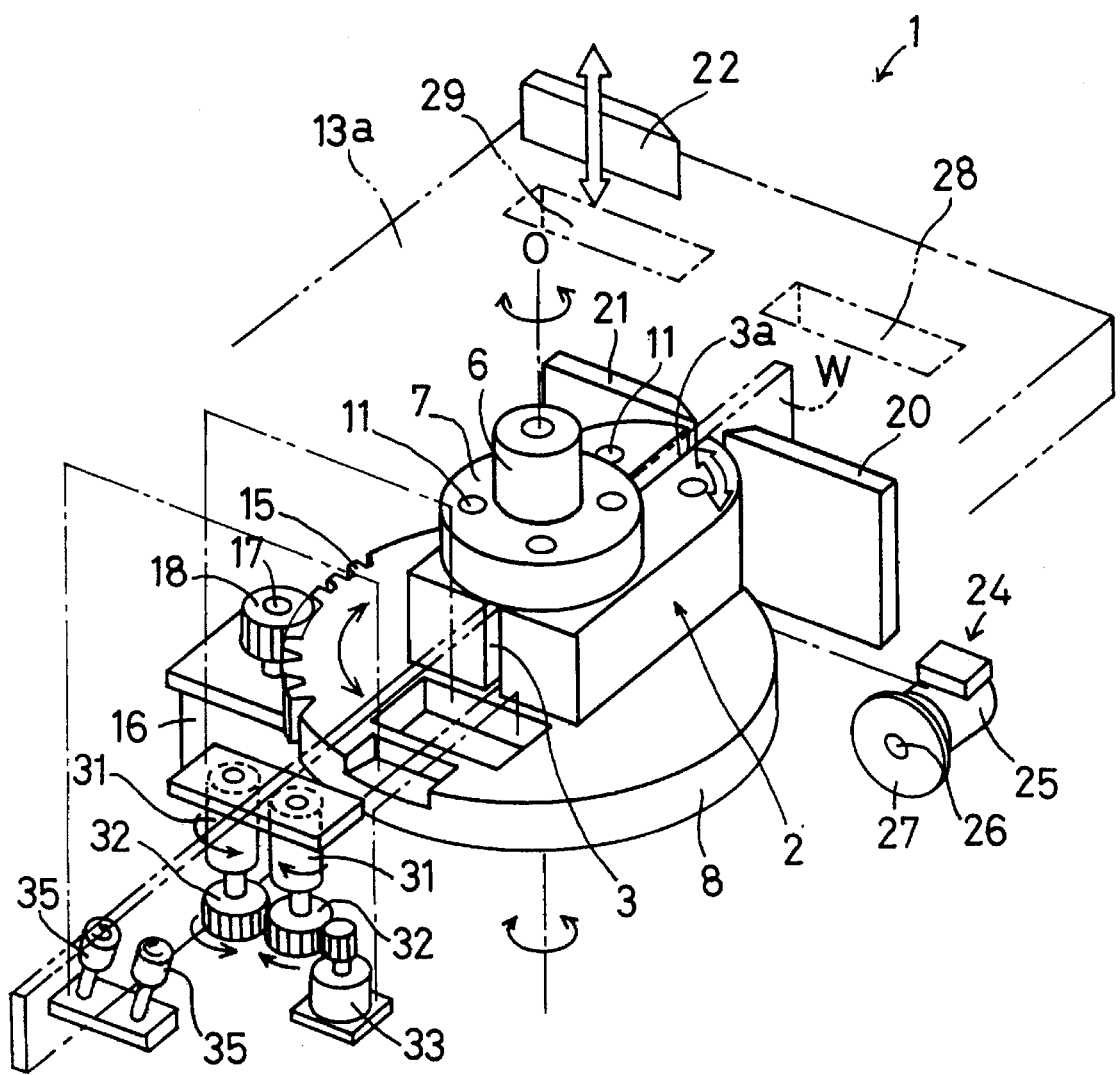
FIG. 1 is a schematic exploded perspective view of an automatic bending apparatus according to a first preferred embodiment of the present invention.

Referring to FIG. 1, reference numeral 1 generally denotes an automatic bending apparatus according to a first preferred embodiment of the present invention. The bending apparatus 1 is provided with a rotatable work holder 2 as the movable work holder according to the present invention. The rotatable work holder 2 is provided with a slit-like passage 3 through which a band work (e.g., band knife) W is allowed to pass. The holder 2 is supported rotatably about a vertical axis O.

Figure 3:
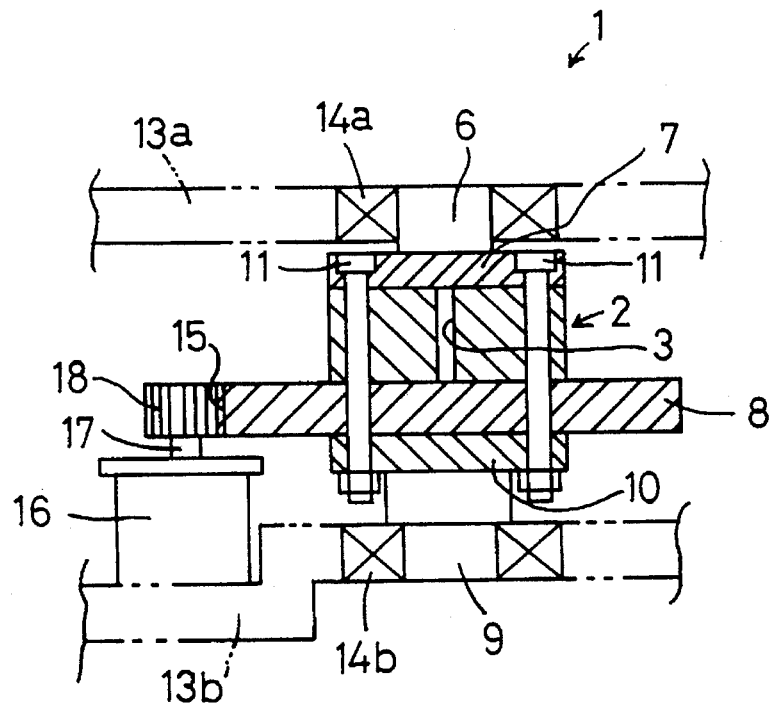
FIG. 3 is a cross section taken along the line III—III in FIG. 2.

As shown in FIG. 3, an upper shaft 6 is located on the upper side of the holder 2 through an upper flange 7, and a lower shaft 9 is located on the lower side of the holder 2 through a circular gear plate 8 and a lower flange 10. The upper shaft 6 and the upper flange 7 are concentric with the lower shaft 9, the lower flange 10 and the gear plate 8, and these are fixed together as a unit by means of a plurality of bolts 11. The upper shaft 6 is rotatably supported by an upper bearing 14a mounted in an upper plate 13a, and the lower shaft 9 is rotatably supported by a lower bearing 14b mounted in a lower plate 13b. Thus, the holder 2 and the gear plate 8 are supported rotatably about the common axis of the upper and lower shafts 6 and 9.

Figure 2:
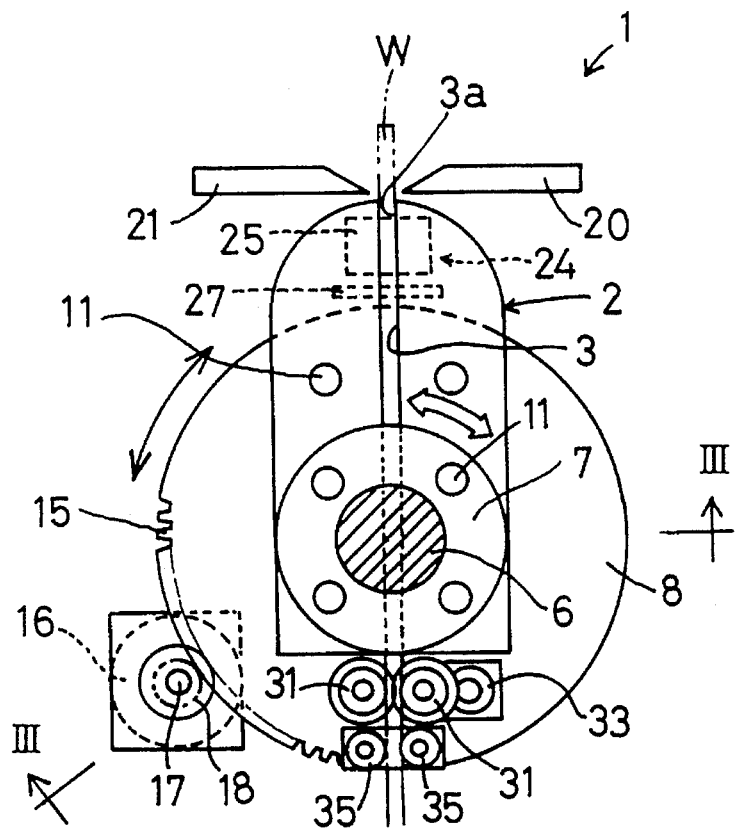
FIG. 2 is a plan view of the bending apparatus shown in FIG. 1.

As shown in FIGS. 1 and 2, the outer circumference of the gear plate 8 is partially formed with gear teeth 15. The gear teeth 15 mesh with a pinion 18 fixed to an output shaft 17 of a motor 16. The motor 16 is adapted to be driven in normal and reverse directions, thereby reciprocatably rotating or swinging the holder 2 in a predetermined angular range.

The passage 3 of the holder 2 extends straight through the central portion of the holder 2 in a work feeding direction. In the vicinity of an outlet 3a of the passage 3, there are replaceably provided first and second fixed bending jigs 20 and 21. The first and second fixed bending jigs 20 and 21 are opposed to each other with the work W projecting from the outlet 3a of the passage 3 interposed therebetween. The first jig 20 serves to bend the work W in the left-hand direction as viewed in FIG. 2, and the second jig 21 serves to bend the work W in the right-hand direction as viewed in FIG. 2. That is, one of the first and second jigs 20 and 21 is selectively used for a single bending operation.

The first and second jigs 20 and 21 are adapted to be vertically moved so that when one of the first and second jigs 20 and 21 is positioned to a raised position to be subjected to the bending operation, the other may be retracted to a lower position. Accordingly, in bending the work W into a U-shape, for example, with use of one of the first and second jigs 20 and 21, the other does not interfere with the work W having been already bent. In the raised position of the first and second jigs 20 and 21, the upper end portions thereof are adapted to be inserted in two guide holes 28 and 29 formed through the upper plate 13a shown in FIG. 1, respectively.

Figure 5:
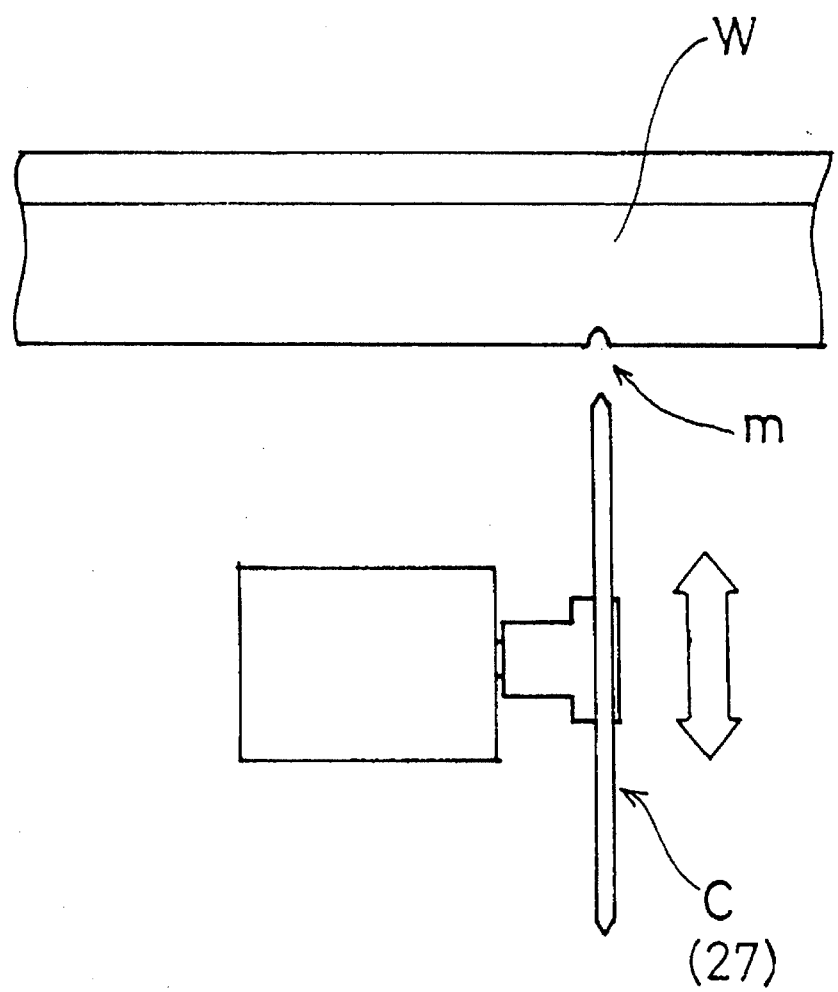
FIG. 5 is a schematic side view illustrating a marking operation to a work.

A marking device 24 is provided under the holder 2. As apparent from FIG. 1, the marking device 24 is comprised of a motor 25, an output shaft 26 of the motor 25, and a thin disk-shaped rotating cutter 27 mounted on the output shaft 26. As shown in FIG. 2, the marking device 24 is located under a front portion of the holder 2 projecting forwardly from the gear plate 8. As shown in FIG. 5, the rotating cutter 27 is adapted to form a notch mark m on the lower edge of the work W. The notch mark m serves as a reference mark for determining a working position on the work W to be punched, manually bent, etc. after the automatic bending operation.

As shown in FIG. 1, a cutter 22 for cutting the work W is vertically movably provided over the second jig 21. The cutter 22 is adapted to be lowered through the guide hole 29 to the same level as that of the holder 2 under the condition where the second jig 21 is in the lower position. Then, the work W is cut at the outlet 3a of the passage 3 by the cutter 22 in cooperation with the rotation of the holder 2.

There are provided a pair of feed rollers 31 as the work feeding device according to the present invention for intermittently advancing the work W in such a direction as to project from the outlet 3a of the passage 3 of the holder 2. The feed rollers 31 are rotatably mounted on the gear plate 8 at the position just behind the holder 2 (i.e., just upstream of the holder 2 in respect of the work feeding direction) so as to sandwich the work W. The feed rollers 31 are adapted to be rotated in opposite directions by a motor 33 through a pair of pinions 32.

Further, a pair of stabilizer rollers 35 for preventing lifting of the work W during the feeding operation are idly rotatably mounted on the gear plate 8 at the position just behind the feed rollers 31 (i.e., just upstream of the feed rollers 31 in respect of the work feeding direction) so as to sandwich the work W. As apparent from FIG. 1, the axes of rotation of the stabilizer rollers 35 are inclined at the same angle in the work feeding direction to impart a downward component of force to the work W, thereby preventing that the work W will rise during the feeding operation.

The operation of the bending apparatus 1 will now be described with reference to FIGS. 4A to 4F.

Figure 4A:
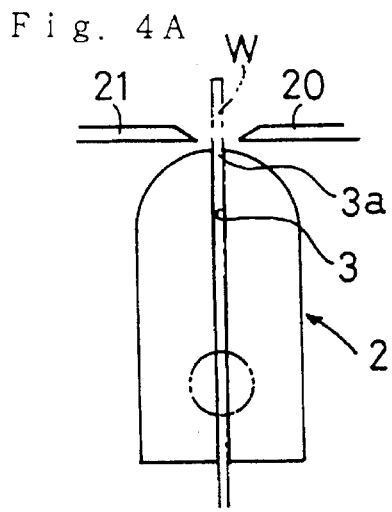
FIGS. 4A to 4F are schematic plan views illustrating the operation of the bending apparatus.
Figure 4D:
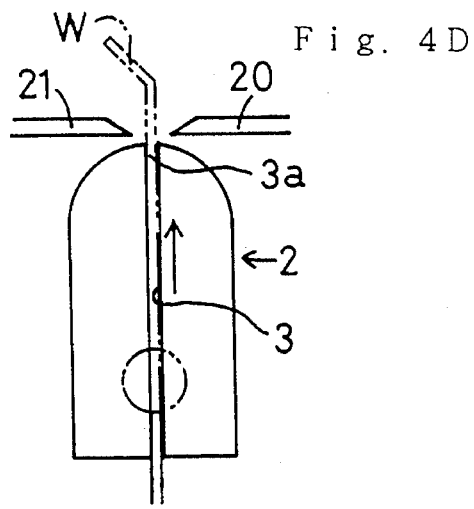
Figure 4B:
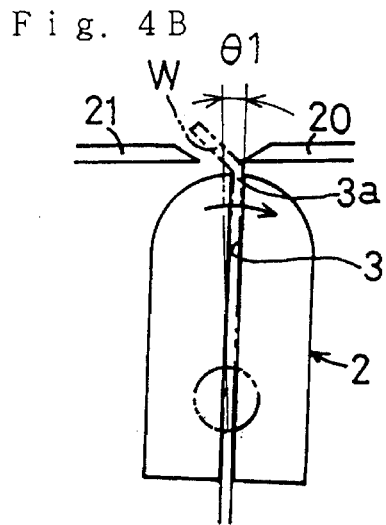

A predetermined amount of the work W is projected from the outlet 3a of the passage 3 of the holder 2 as shown in FIG. 4A. In this condition, the holder 2 is rotated at a predetermined small angle $\theta_1$ in a clockwise direction as shown in FIG. 4B. As a result, the projecting portion of the work W held by the holder 2 is pressed against the first jig 20, and is accordingly bent at a desired angle.

Figure 4E:
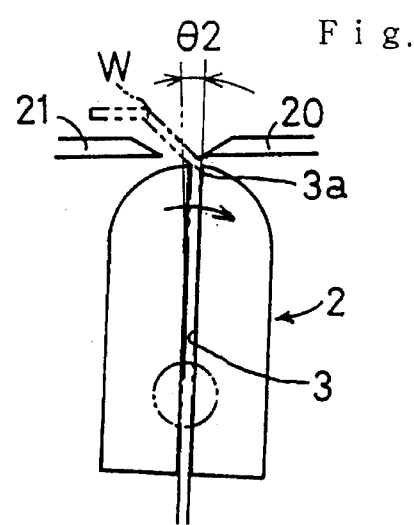
Figure 4C:
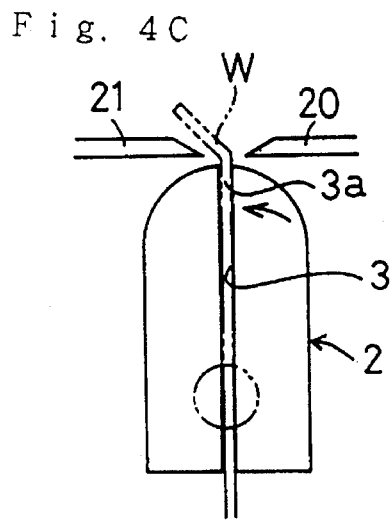
Figure 4F:
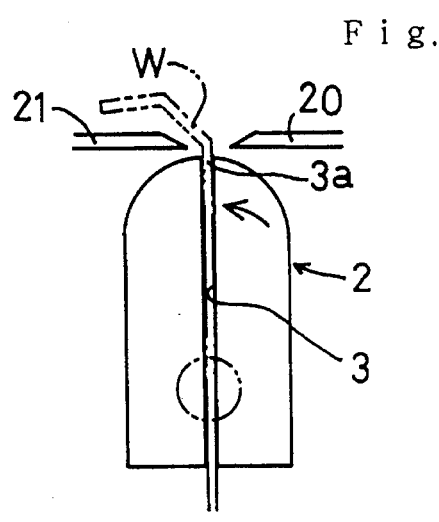

Then, as shown in FIG. 4C, the holder 2 is rotated at the angle $\theta_1$ in a counterclockwise direction to restore the original or neutral position. Then, the work W is advanced in a predetermined amount as shown in FIG. 4D, and then the holder 2 is rotated at a predetermined angle $\theta_2$ in the clockwise direction again as shown in FIG. 4E. Accordingly, the work W is bent at another desired angle at another position different from that shown in FIG. 4B by the first jig 20. Then, the holder 2 is rotated in the counterclockwise direction as shown in FIG. 4F to restore the original position. Subsequently, the work W is sequentially bent in the same way as above to obtain a desired form. For example, an approximately arcuate form of the work W can be easily obtained by the reciprocating rotation of the holder 2 in a predetermined angular range in cooperation with the first or second jig 20 or 21 and by the intermittent feed of the work W.

A second preferred embodiment of the present invention will now be described with reference to FIGS. 6 to 16.

Referring to FIGS. 6 to 9, reference numeral 101 generally denotes an automatic bending apparatus according to the second preferred embodiment. A body 40 of the bending apparatus 101 includes a base 41 provided on a floor and a table 42 provided over the base 41. A rotatable work holder 102 as the movable work holder according to the present invention is rotatably mounted on the table 42 so as to be rotatable about a vertical axis O together with a substantially sectoral gear plate 108. The gear plate 108 has gear teeth 115 meshing with a pinion 118 fixed to an output shaft of a reversible motor 116. Accordingly, the holder 102 is rotated or swung in opposite directions in a predetermined angular range by the motor 116 through the pinion 118 and the gear plate 108.

Figure 8:
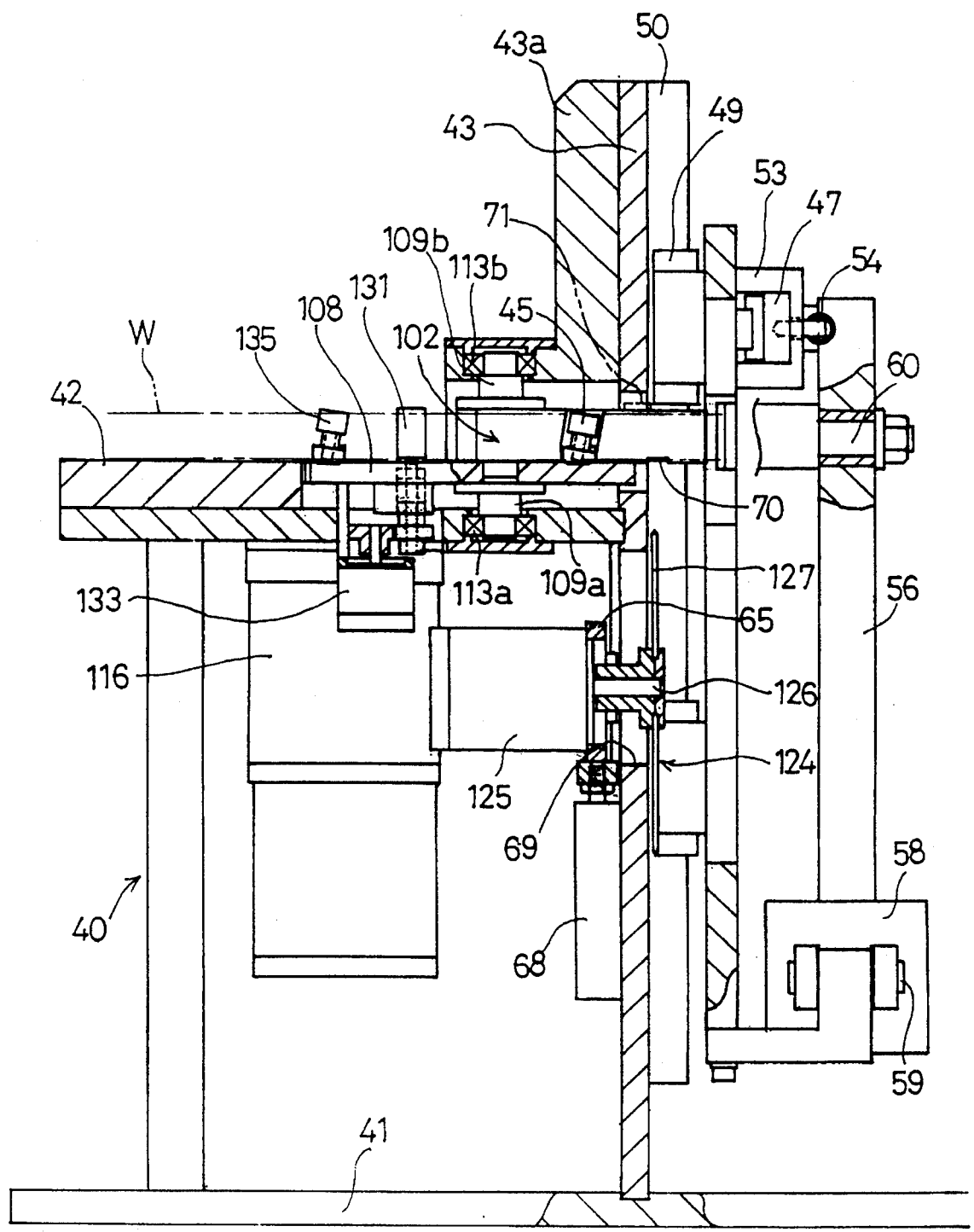
FIG. 8 is a vertical sectional side view of FIG. 6.

As shown in FIG. 8, the holder 102 and the gear plate 108 are integrally connected by a vertical lower shaft 109a. The lower shaft 109a is rotatably supported by a lower bearing 113a mounted in the table 42. A vertical frame 43 is fixedly mounted on the base 41, and an L-shaped bracket 43a is fixed to the vertical frame 43. A vertical upper shaft 109b fixed to the holder 102 is rotatably supported by an upper bearing 113b mounted in the L-shaped bracket 43a. A pair of feed rollers 131 for feeding a band-shaped work W are rotatably mounted on the gear plate 108 at the position just behind the holder 102 so as to sandwich the work W. The feed rollers 131 are rotatably driven by a motor 133 fixed to the gear plate 108. Two pairs of stabilizer rollers 135 and 45 for preventing lifting of the work W are idly rotatably provided on the upstream and downstream sides of the feed rollers 131 in respect of the work feeding direction. The axes of rotation of the stabilizer rollers 135 and 45 are inclined at the same angle in the work feeding direction.

Figure 6:
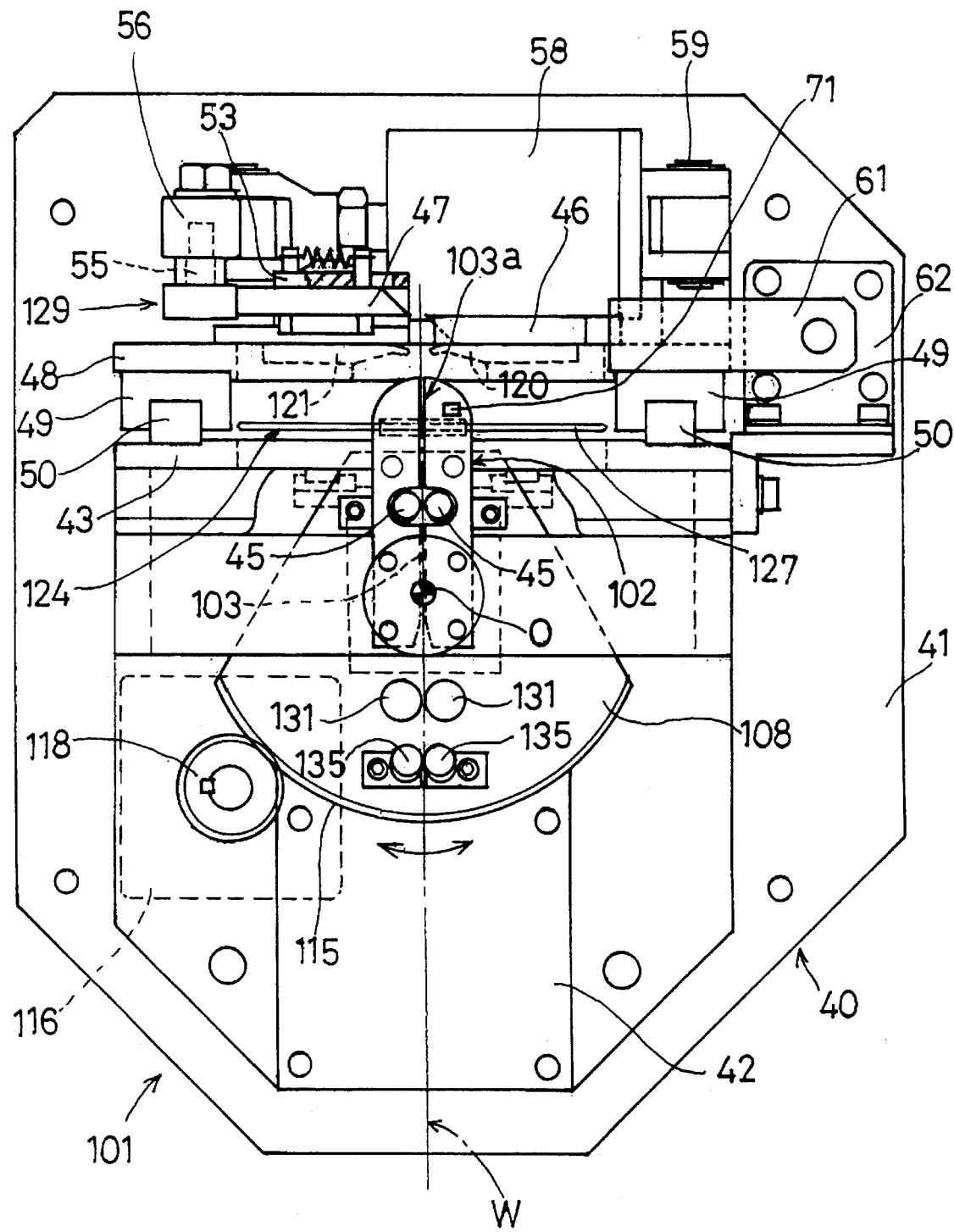
FIG. 6 is a plan view of an automatic bending apparatus according to a second preferred embodiment of the present invention.

As shown in FIG. 6, the holder 102 is formed at its central portion with a straight passage 103 for allowing passing of the work W. Accordingly, the width of the passage 103 is set to be somewhat larger than the thickness of the work W. In the vicinity of an outlet 103a of the passage 103, there are provided first and second fixed bending jigs 120 and 121. Further, adjacent to the bending jigs 120 and 121 on the downstream side thereof, there is provided a cutter unit 129 comprising a fixed cutting member 46 and a movable cutting member 47.

Figure 9:
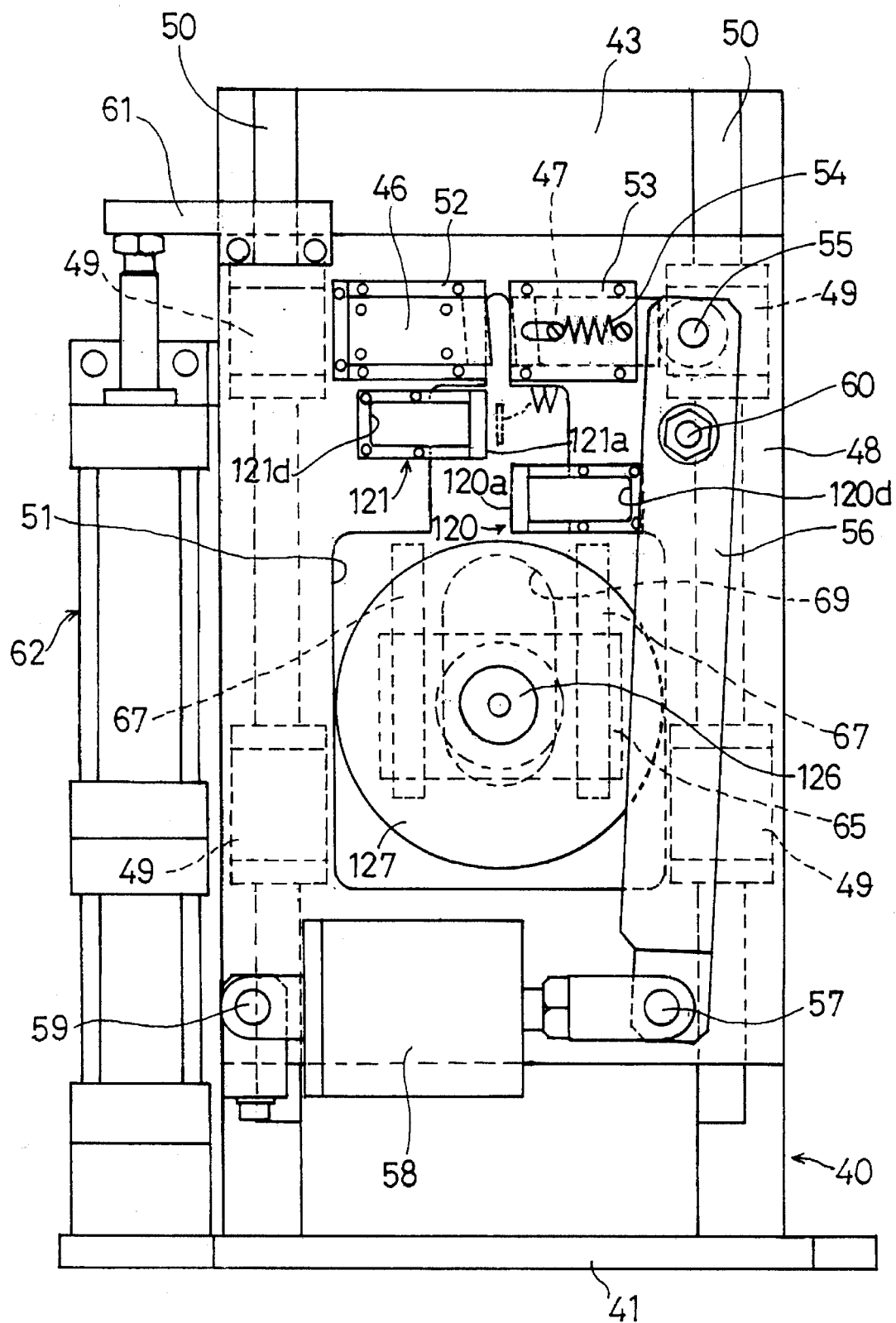
FIG. 9 is a front elevational view of FIG. 6.
Figure 10:
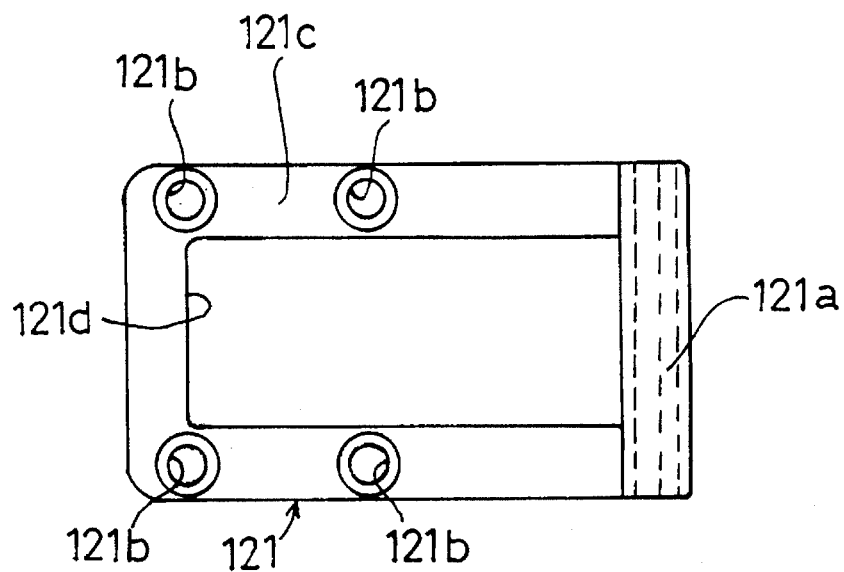
FIG. 10 is a front elevational view of a fixed bending jig in the second preferred embodiment.
Figure 11:
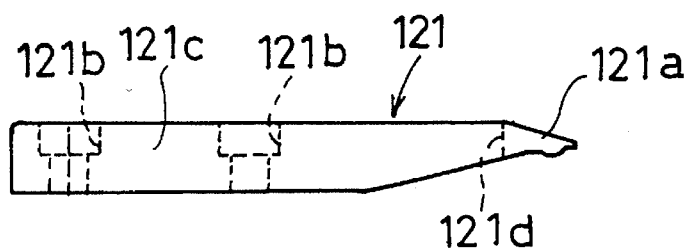
FIG. 11 is a plan view of the fixed bending jig.
Figure 12:
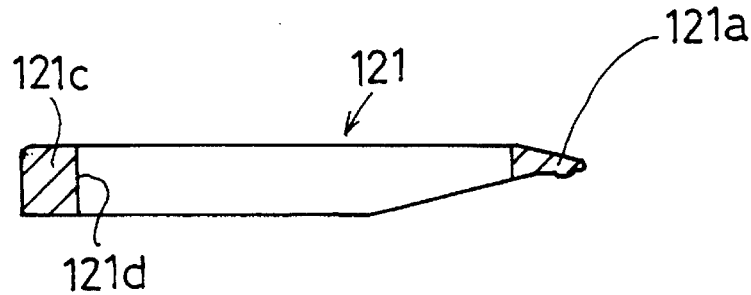
FIG. 12 is a horizontal sectional view of the fixed bending jig.
Figure 13:
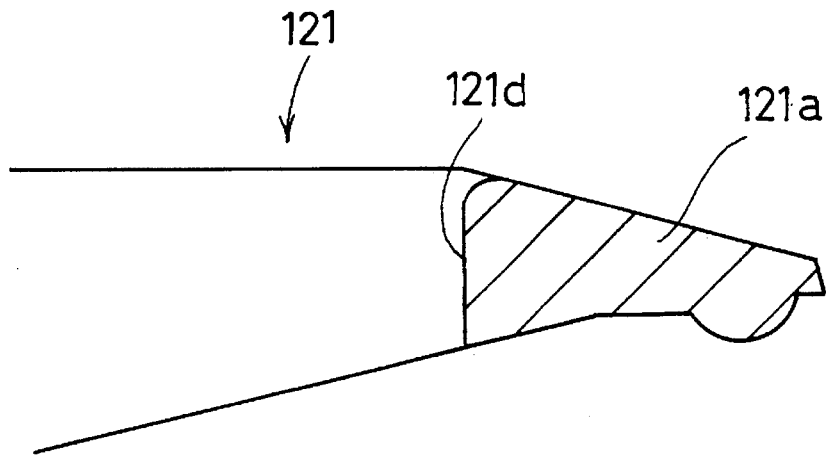
FIG. 13 is an enlarged view of a part of FIG. 12.

As shown in FIG. 9, a rectangular shift plate 48 as the movable base according to the present invention is vertically movably mounted on the vertical frame 43 of the body 40. A pair of vertically extending guide rails 50 are mounted on the vertical frame 43, and four guided portions 49 of the shaft plate 48 are slidably engaged with the guide rails 50, thereby effecting the vertical movement of the shift plate 48 along the guide rails 50. The shift plate 48 is formed at its central portion with an opening 51. The first and second jigs 120 and 121 are fixed to the shaft plate 48 at different levels in such a manner that the inner end portions of the jigs 120 and 121 project into the opening 51. In this preferred embodiment, the second jig 121 is fixed at a position higher than that of the first jig 120. The reason why the first and second jigs 120 and 121 are fixed at the different levels is to prevent that the work W bent by one of the first and second jigs 120 and 121 will interfere with the other. As shown in FIGS. 10 to 13, the second jig 121 has a hollow structure consisting of a bending portion 121a and U-shaped fixed portion 121c having a plurality of bolt holes 121b for receiving a plurality of bolts (not shown), thereby defining a rectangular opening 121d. The height of the rectangular opening 121d is set to be larger than that of the work W. The reason of the formation of the rectangular opening 121d and this setting of the height is to prevent that a previously bent portion (i.e., substantially arcuate portion) of the work W will interfere with the second jig 121 in the course of approach of the holder 102 to the second jig 121. In other words, the previously bent portion of the work W comes into the rectangular opening 121d in the course of approach of the holder 102 to the second jig 121, thereby avoiding the interfere of the work W with the second jig 121. Although the above description has been directed to the second jig 121, the first jig 120 has the same structure as that of the second jig 121.

Referring back to FIG. 9, the fixed cutting member 46 and the movable cutting member 47 are mounted through holders 52 and 53, respectively, to the shift plate 48 at the level higher than that of the second jig 121. The movable cutting member 47 is horizontally movably held in the holder 53, and is normally biased away from the fixed cutting member 46 by means of a tension spring 54. The movable cutting member 47 is connected through a pin 55, a lever 56 and a pin 57 to a cutter cylinder 58. The cutter cylinder 58 is mounted through a pivot pin 59 to the shaft plate 48. The lever 56 is pivotably connected by a fulcrum shaft 60 to the shift plate 48. Accordingly, when the lever 56 is pivoted about the fulcrum shaft 60 in a counterclockwise direction as viewed in FIG. 9 by operating the cutter cylinder 58, the movable cutting member 47 is advanced (i.e., moved leftwardly as viewed in FIG. 9) against the biasing force of the tension spring 54, thereby cutting the work W in cooperation with the fixed cutting member 46.

The shift plate 48 is connected at an upper end thereof through a bracket 61 to a lift cylinder 62 standing on the base 41. The shift plate 48 is vertically moved by operating the lift cylinder 62 to selectively possess one of three vertical positions with reference to the vertical position (fixed) of the work W. That is, the three vertical positions are set as a first position (highest position) where the first jig 120 is opposed to the work W, a second position (middle position) where the second jig 121 is opposed to the work W, and a third position (lowest position) where the fixed and movable cutting members 46 and 47 are opposed to the work W. Accordingly, the work W is bent by the first jig 120 in the first position; the work W is bent by the second jig 121 in the second position; and the work W is cut by the fixed and movable cutting members 46 and 47 in the third position.

Figure 7:
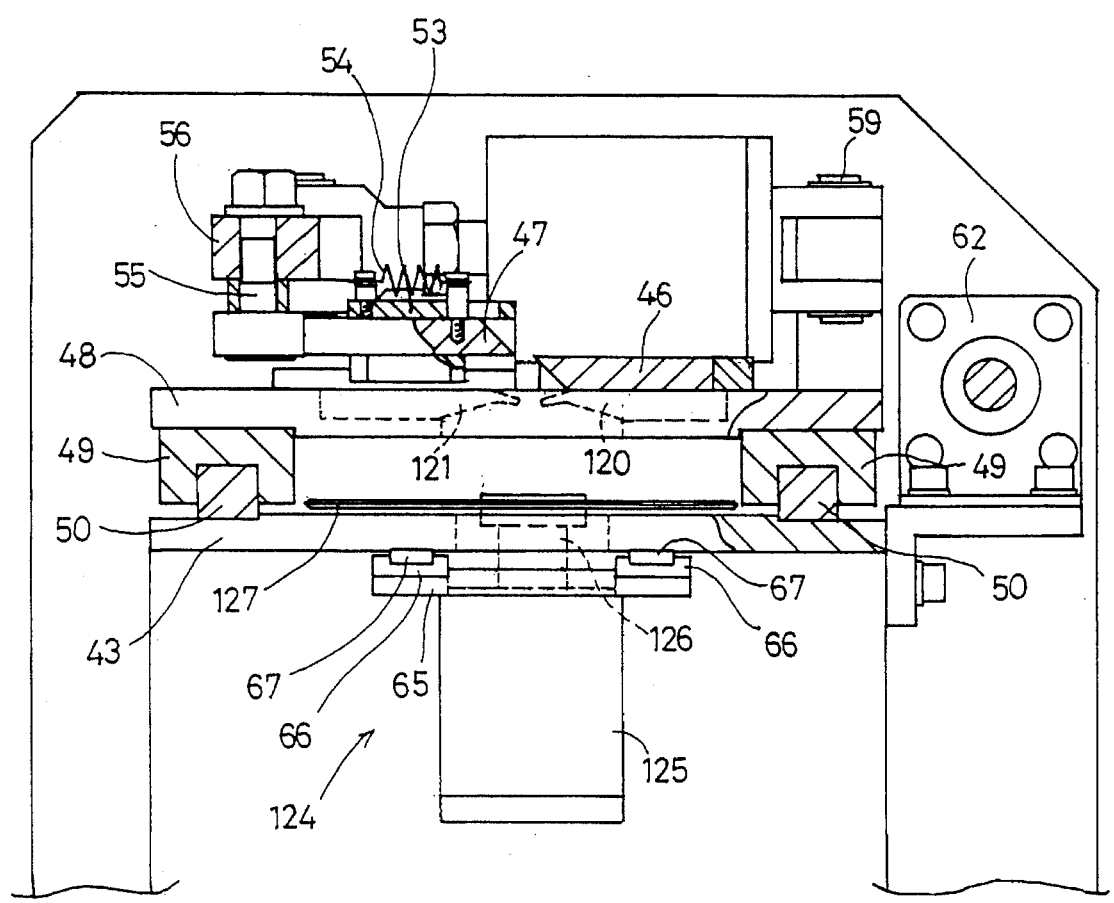
FIG. 7 is a plan view of a part of FIG. 6.

As shown in FIG. 8, a marking device 124 is provided under the holder 102. The marking device 124 includes a thin disk-shaped rotating cutter 127 as the notching means according to the present invention. The rotating cutter 127 is located somewhat upstream of the outlet 103a of the passage 103 of the holder 102 so as to be oriented in perpendicular to the feeding direction of the work W. The rotating cutter 127 is mounted on an output shaft 126 of a motor 125 and is adapted to be rotated in a vertical plane by the motor 125. As shown in FIG. 7, the motor 125 is fixed to a bracket 65 having a pair of guided portions 66. The guide portions 66 are slidably engaged with a pair of vertically extending guide rails 67 mounted on the vertical frame 43. Thus, the motor 125 and the rotating cutter 127 are supported to the vertical frame 43 so as to be vertically movable along the guide rails 67. Incidentally, replacement of the rotating cutter 127 with a fresh one may be carried out through the opening 51 formed through the shift plate 48.

As shown in FIG. 8, a marking cylinder 68 is connected to the bracket 65 of the motor 125. The marking cylinder 68 is operated to vertically move the rotating cutter 127 and the motor 125 in the vertical range defined by a vertically elongated through hole 69 formed through the vertical frame 43. Accordingly, when the rotating cutter 127 is lifted by the cylinder 68 to such a position that the outer circumference of the rotating cutter 127 cuts into the lower edge of the work W, a notch mark m as shown in FIG. 5 is formed on the lower edge of the work W. As shown in FIG. 8, the bottom surface of the holder 102 is formed with a recess 70 for permitting the outer circumference of the rotating cutter 127 to cut into the lower edge of the work W.

Figure 14:
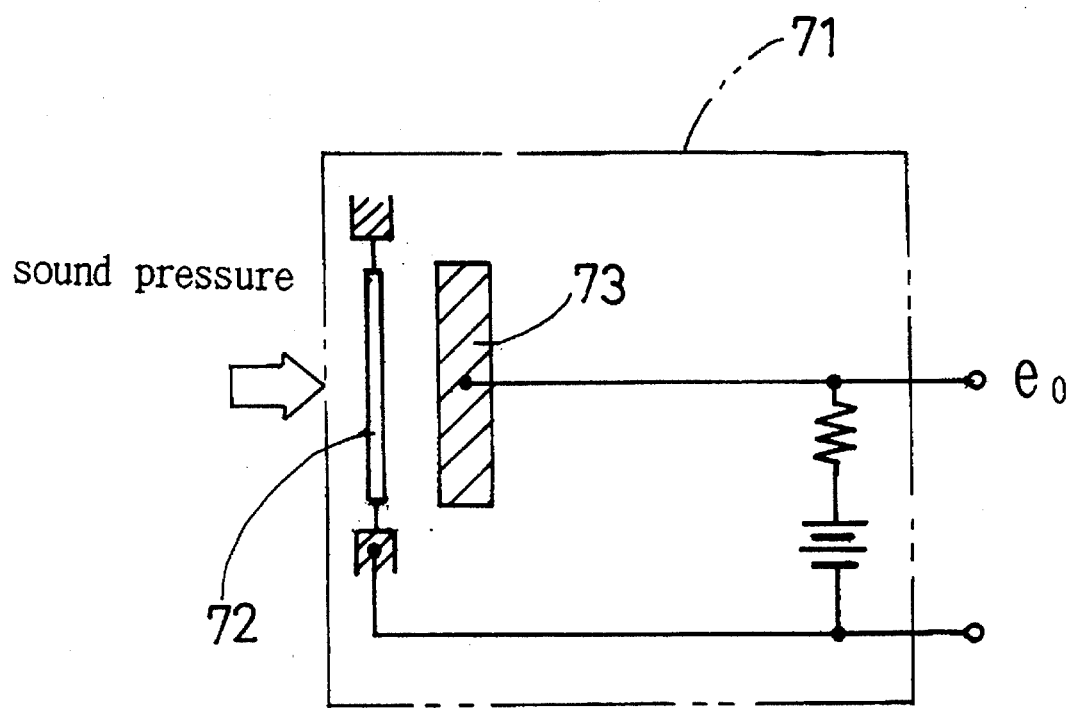
FIG. 14 is a schematic diagram of a capacitor microphone in the second preferred embodiment.

Further, a known capacitor microphone (which will be hereinafter referred simply to as a microphone) 71 as the cutting sound detecting device according to the present invention is fixed to the upper surface of the holder 102 at the position over the rotating cutter 127. As shown in FIG. 14, the microphone 71 is comprised of a vibration plate 72 adapted to be vibrated by sound pressure and a rigid plate (fixed electrode) 73 opposed to the vibration plate 72. As well known in the art, an electrostatic capacity between the vibration plate 72 and the rigid plate 73 is changed by the vibration of the plate 72 in receipt of sound pressure, thereby converting sound into voltage.

Figure 15:
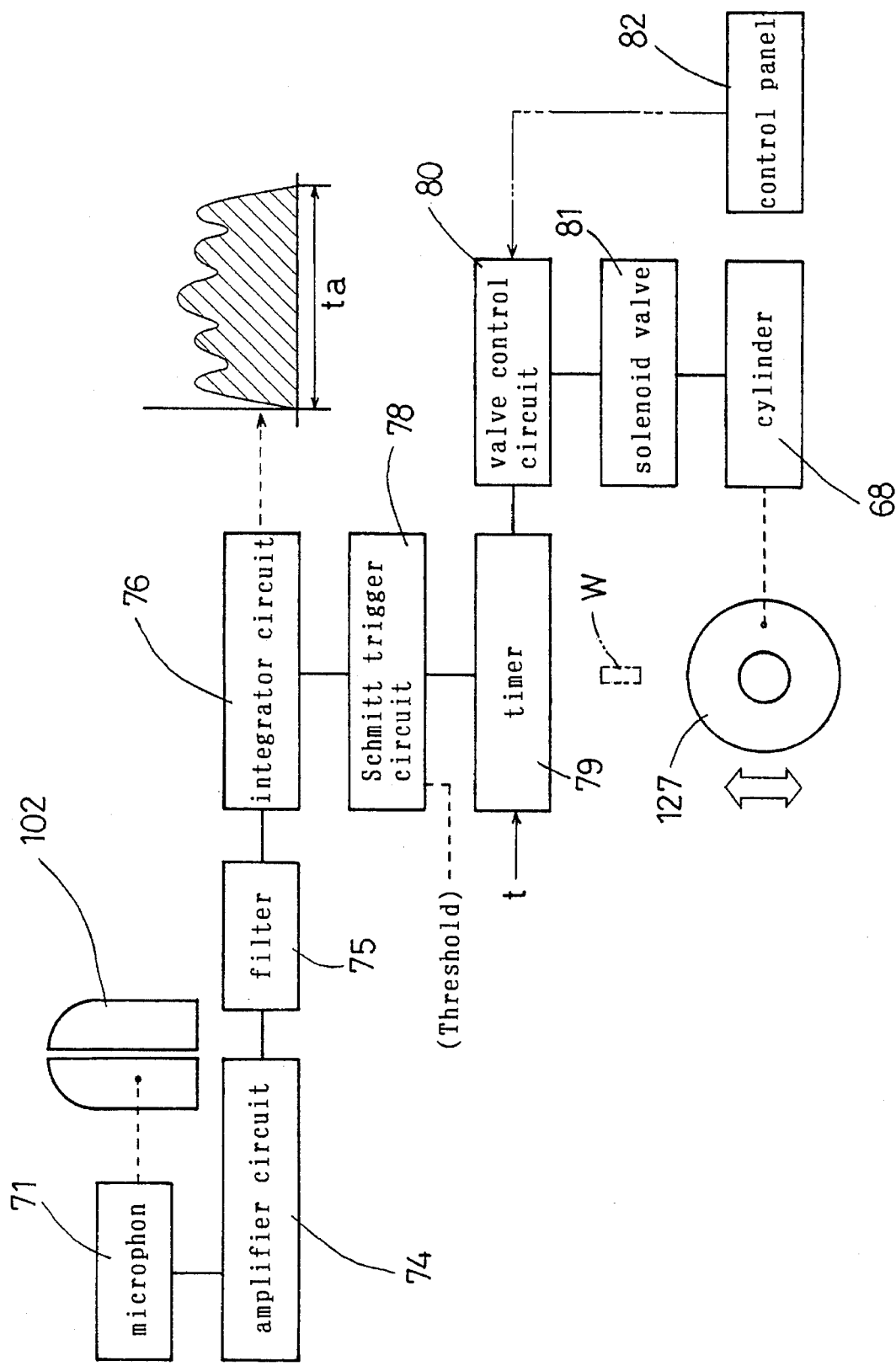
FIG. 15 is a block diagram of a control circuit for a marking device in the second preferred embodiment.

As shown in FIG. 15, the microphone 71 is connected to an amplifier circuit 74, which is in turn connected to a filter 75, so that an output voltage of the microphone 71 is amplified by the amplifier circuit 74, and signals of any frequency ranges other than a frequency range of a cutting sound generating in cutting of the work W by the rotating cutter 127 are removed as a noise by the filter 75. Then, the output signals from the filter 75 are input into an integrator circuit 76, in which the output waveform from the filter 75 is integrated during a certain short period of time ta (e.g., about 0.5 seconds). Then, an output from the integrator circuit 76 is input into a Schmitt trigger circuit 78 in which a certain threshold is previously set, so that when the output from the integrator circuit 76 exceeds the threshold, an output signal from the circuit 78 is supplied to a timer 79.

The reason why the output waveform from the filter 75 is integrated during the certain short period of time ta is that there is a possibility that the output waveform from the filter 75 will contain an instantaneous noise component and it is therefore necessary to distinguish the relatively continuous cutting sound from the instantaneous noise component. In other words, if the integral value of the output waveform during the certain period of time ta is larger than the certain threshold, it is determined that the output waveform has been caused by the cutting sound, that is, it is determined that the rotating cutter 127 has come into contact with the work W.

When the output signal from the Schmitt trigger circuit 78 is supplied to the timer 79, a predetermined time t is set in the timer 79. The timer 79 is connected to a valve control circuit 80 for controlling a solenoid valve 81 in the marking cylinder 68. A marking position on the work W is previously set by a control panel 82. When the marking position comes just over the rotating cutter 127, the feed of the work W is stopped and the cylinder 68 starts to be operated through the valve control circuit 80 and the solenoid valve 81, thereby lifting the rotating cutter 127. When the predetermined time t set in the timer 79 has elapsed, the cylinder 68 once stops to be operated through the valve control circuit 80 and the solenoid valve 81, thereby effecting the cutting-in of the lower edge of the work W with a predetermined depth. Then, the cylinder 68 is operated again to lower the rotating cutter 127.

The operation of the bending apparatus 101 will now be described.

In bending the work W, either the first position or the second position of the shift plate 48 is selected by the lift cylinder 62 to determine whether either the first jig 120 or the second jig 121 is to be used. Thereafter, the bending operation substantially the same as that mentioned in the first preferred embodiment is carried out, so the explanation of the actual bending operation will be omitted herein. Further, in cutting the work W, the third position of the shift plate 48 is selected to bring the fixed cutting member 46 and the movable cutting member 47 into opposition to the work W. Then, the movable cutting member 47 is moved by operating the cutter cylinder 58 to cut the work W in cooperation with the fixed cutting member 46.

In marking the work W, when the predetermined marking position on the work W comes Just over the rotating cutter 127, the feed of the work W is stopped under the neutral condition of the holder 102. In this condition, the marking cylinder 68 is operated to lift the rotating cutter 127 together with the motor 125 toward the lower edge of the work W, so as to make the notch mark m as shown in FIG. 5.

Figure 16:
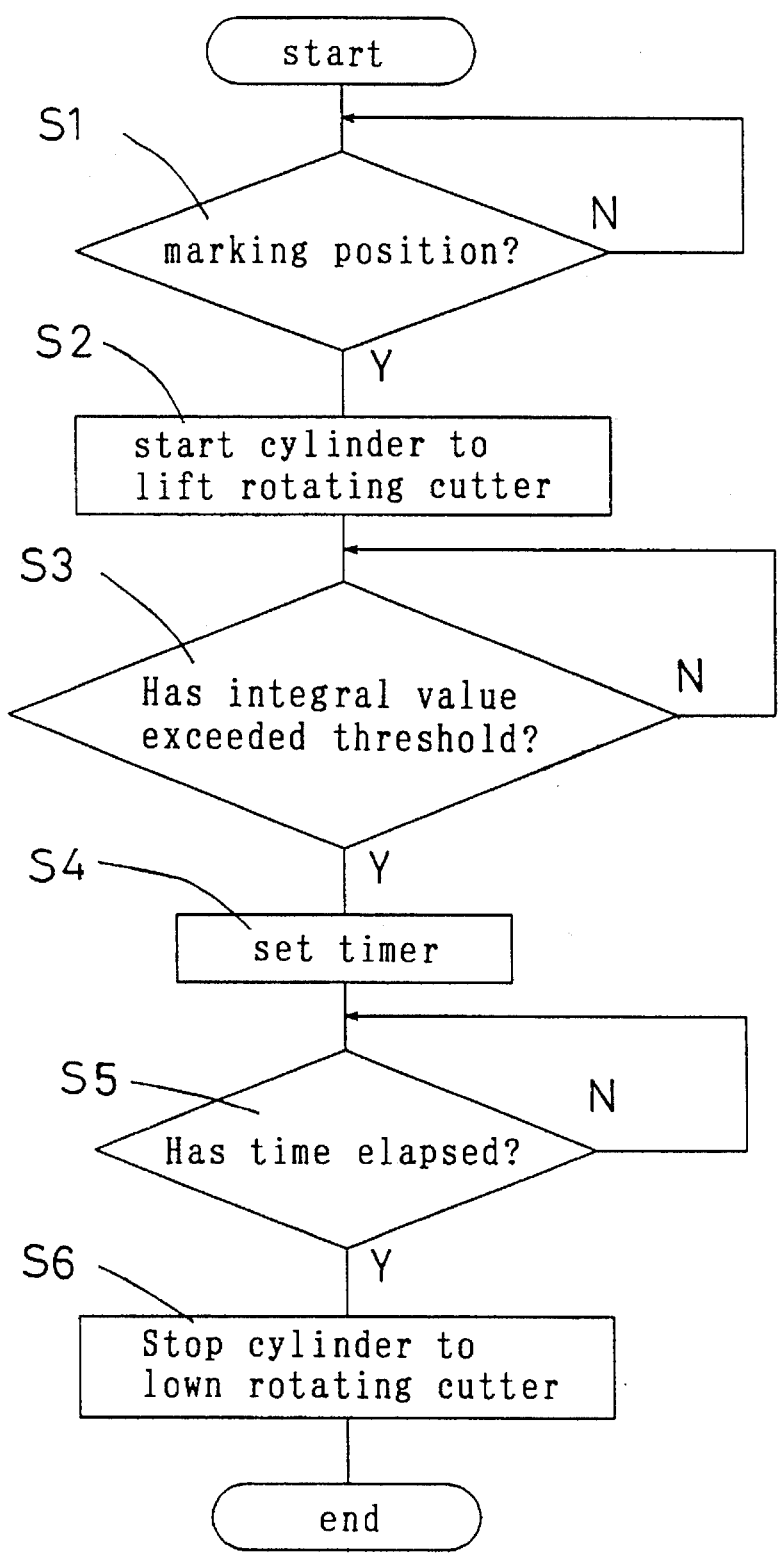
FIG. 16 is a flowchart of a marking operation in the second preferred embodiment.
Figure 17:
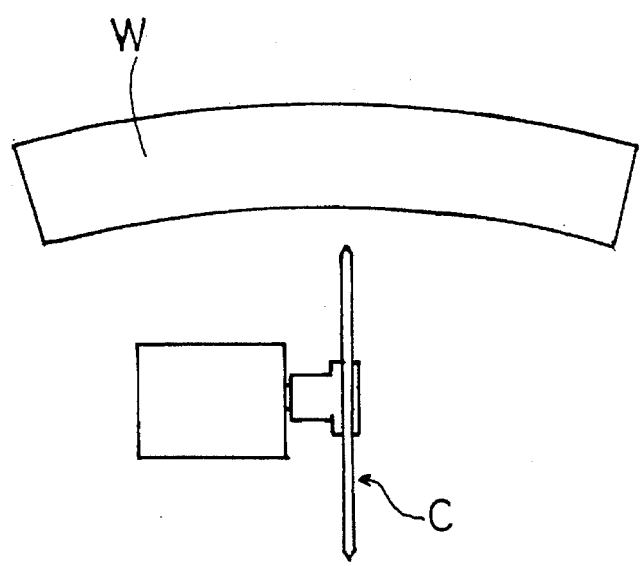
FIG. 17 is a schematic side view illustrating a marking operation in the case where the work is upwardly curved.
Figure 18:
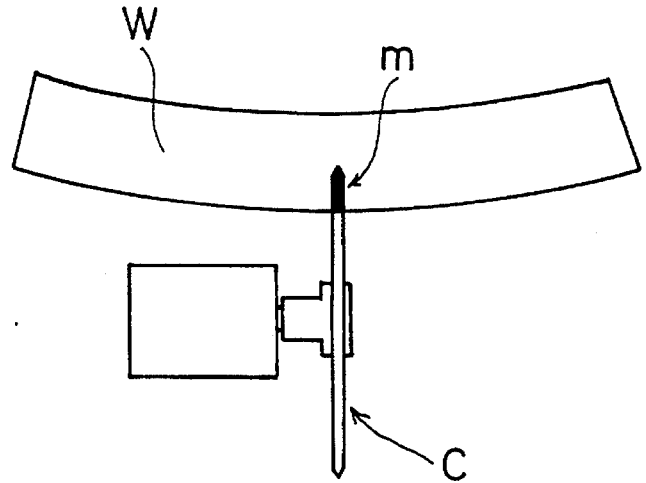
FIG. 18 is a schematic side view illustrating a marking operation in the case where the work is downwardly curved.
Figure 19:
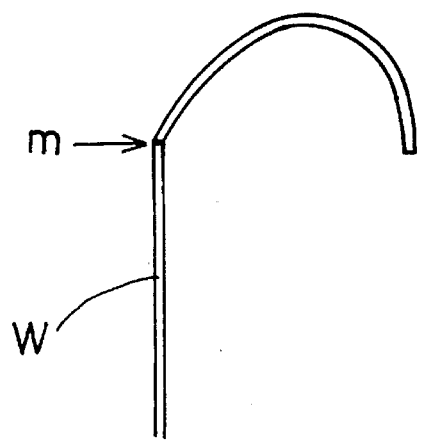
FIG. 19 is a view illustrating a problem to be caused by the case shown in FIG. 18.
Figure 20:
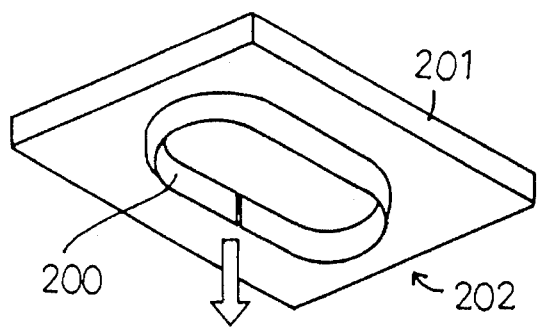
FIG. 20 is a perspective view of a punching die including a band knife produced from a band-shaped work.
Figure 21:
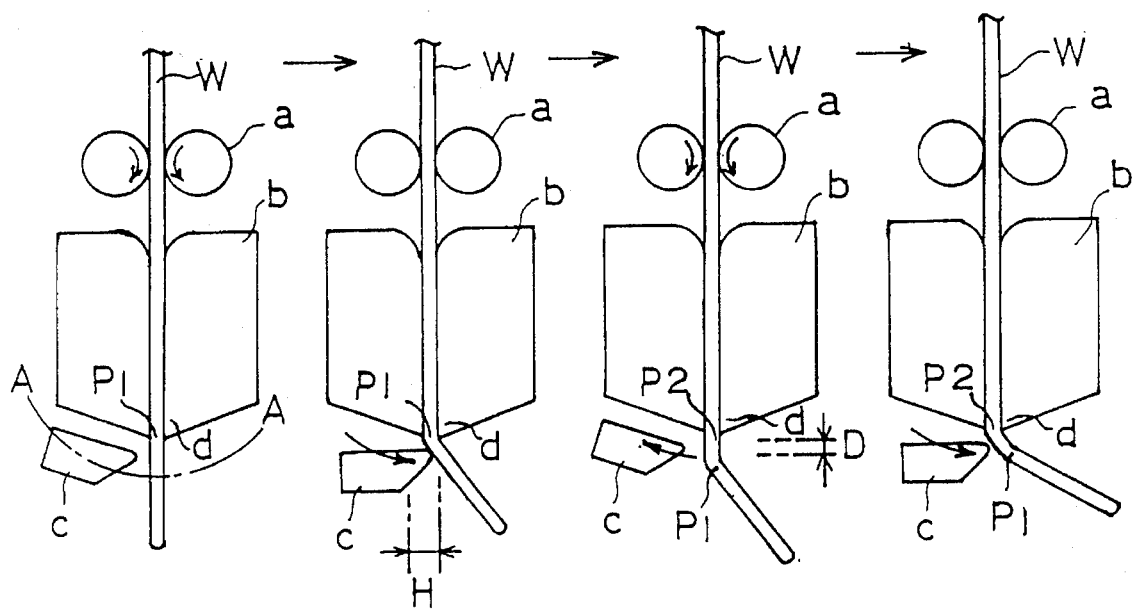
FIG. 21 is a schematic plan view illustrating the operation of a bending apparatus in the prior art.

The control flow of the marking operation will be described in brief with reference to FIG. 16. When the predetermined marking position on the work W is detected in step S1, the marking cylinder 68 is operated to lift the rotating cutter 127 toward the marking position on the work W in step S2. Then, in step S3, it is determined whether or not the outer circumference of the rotating cutter 127 has come into contact with the lower edge of the work W. More specifically, the output waveform from the microphone 71 is amplified by the amplifier circuit 74, and the noise is removed by the filter 75. Then, the output waveform from the filter 75 is integrated by the integrator circuit 76, and if the integral value from the integrator circuit 76 has exceeded the threshold in the Schmitt trigger circuit 78, the answer in step S3 becomes YES. At this time, the predetermined time t defining a depth of cutting of the rotating cutter 127 into the lower edge of the work W is set in the timer 79 in step S4.

When the predetermined time t has elapsed in step S5, the operation of the marking cylinder 68 is once stopped, and then the cylinder 68 is operated again to lower the rotating cutter 127. Thus, the marking operation to the work W at the predetermined marking position is ended. Subsequently, at the other predetermined marking positions on the work W, the same marks are similarly formed.

Having thus described the specific preferred embodiments of the present invention, they are merely illustrative and various modifications may be made within the scope and spirit set out in the accompanying claims. For example, the rotating cutter 127 may be vertically moved by a ball screw mechanism and a motor, and the cutting depth of the work W by the rotating cutter 127 may be controlled according to the number of revolutions (e.g., the number of pulses) of the motor. Further, the rotatable work holder 102 may be replaced by a linearly reciprocatable work holder, and the rotating cutter 127 may be replaced by a linearly reciprocatable cutter.

What is claimed is:

1. An automatic bending apparatus for bending a band-shaped work adapted to be fed in a longitudinal direction of said work thereof, comprising:

a fixed bending jig removably provided so as to be opposed to a side surface of said work;

a movable work holder provided movably toward and away from said fixed bending jig in an oscillating motion within a small angle, said holder having a passage extending in said longitudinal direction for holding said work therein and permitting passing of said work therethrough, wherein said work is partially projected from an outlet of said passage and is struck against said jig by said motion of said holder, thereby effecting bending of said work;

a driving device for driving said movable work holder;

a work feeding device which intermittently feeds said work to project said work from said outlet of said passage of said holder after the completion of one step of said bending of said work, moves the bent portion of said work away from said outlet, and projects the non-bent portion of said work to locate said non-bent portion in a position opposite to said fixed bending jig; and wherein while said work feeding device is intermittently feeding said work, different portions of said work are subsequently struck against said fixed bending jig by said movable work holder so that said work is bent in a designated shape.

2. The automatic bending apparatus as defined in claim 1, wherein said moveable work holder comprises a rotatable work holder provided rotatably about an axis, further comprising;

a gear plate fixed to said holder in coaxial relationship thereto, said gear plate having outer circumferential gear teeth;

a pinion meshing with said gear teeth of said gear plate; and a motor for reversibly rotating said pinion, whereby said holder is moved in an oscillating motion about said axis by driving said motor.

3. The automatic bending apparatus as defined in claim 1, wherein said fixed bending jig comprises a first jig for bending said work in a first direction and a second jig for bending said work in a second direction opposite to said first direction, further comprising:

a movable base on which said first and second jigs are fixedly mounted in a positional relationship such that said first and second jigs are offset from each other for avoiding to oppose each other across said work; and an actuator operatively connected to said movable base for moving said movable base to select one of a first position where said first jig is opposed to one side surface of said work and a second position where said second jig is opposed to another side surface of said work.

4. The automatic bending apparatus as defined in claim 3, further comprising a pair of cutting members opposed to each other for cutting said work across the thickness thereof with said work interposed between said cutting members, said cutting members being mounted on said movable base so as to be offset from said first and second jigs and located downstream of said first and second jigs in respect of said longitudinal direction of said work, said actuator moving said movable base to select one of said first position, said second position and a third position where said cutting members are opposed to both surfaces of said work.

5. The automatic bending apparatus as defined in claim 1, wherein said fixed bending jig has a hollow structure comprising a fixed portion and a bending portion adapted to abut against said side surface of said work to define an opening between said fixed portion and said bending portion, whereby a previously bent portion of said work comes into said opening in the course of approach of said holder to said jig, thereby preventing interference between said work and said jig.

6. The automatic bending apparatus as defined in claim 1, further comprising:

means for notching an edge of said work extending in said longitudinal direction; and means for providing relative movement between said notching means and said work so that said notching means and said work are relatively moved toward and away from each other.

7. The automatic bending apparatus as defined in claim 6, wherein said notching means comprises a thin disk-shaped rotating cutter and a motor for rotating said rotating cutter, said rotating cutter and said motor being adapted to be moved toward and away from said work.

8. The automatic bending apparatus as defined in claim 6, further comprising:

a cutting sound detecting device for detecting a cutting sound generating when said notching means cuts into said edge of said work; and control means for controlling said relative movement providing means so that when said cutting sound is not detected by said cutting sound detecting device during the relative movement, it is determined that said notching means has not yet come into contact with said edge of said work to continue the relative movement until the contact is reached, while when said cutting sound is detected by said cutting sound detecting device during the relative movement, it is determined that said notching means has come into contact with said edge of said work to further continue the relative movement until a predetermined cutting depth of said work is reached.

9. The automatic bending apparatus as defined in claim 8, wherein said cutting sound detecting device comprises a microphone located in the vicinity of a notching position on said work held by said holder; and said control means comprises a filter for removing signals in frequency ranges other than a frequency range of said cutting sound, means for integrating an output waveform from said filter during a certain short period of time, means for determining whether an output from said integrating means is greater than a predetermined threshold and generating an output signal when said output from said integrating means has become greater than said predetermined threshold, and means for setting said cutting depth on the basis of a timing of receipt of said output signal from said determining means.

10. The automatic bending apparatus as defined in claim 1, wherein said fixed bending jig comprises a first jig for bending said work in a first direction and a second jig for bending said work in a second direction opposite to said first direction, wherein said first jig and second jig are mounted to be relatively movable to positions being offset each other, thereby avoiding to oppose each other across said work.

11. The automatic bending apparatus as defined in claim 1, wherein said fixed bending jig is removeably provided so as to be opposed to a side surface of said work, wherein said fixed bending jig has a hollow structure comprising a fixed portion and a bending portion adapted to abut against said side surface of said work to define an opening between said fixed portion and said bending portion, whereby a previously bent portion of said work comes into said opening in the course of approach of said holder to said jig, thereby preventing interference between said work and said jig.

12. An automatic bending apparatus for bending a band-shaped work adapted to be fed in a longitudinal direction of said work thereof, comprising:

a fixed bending jig removably provided so as to be opposed to a side surface of said work, wherein said fixed bending jig comprises:

a first jig for bending said work in a first direction;

a second jig for bending said work in a second direction opposite to said first direction;

a movable base on which said first and second jigs are fixedly mounted in a positional relationship such that said first and second jigs are offset from each other; and an actuator operatively connected to said movable base for moving said movable base to select one of a first position where said first jig is opposed to one side surface of said work or a second position where said second jig is opposed to another side surface of said work;

a movable work holder provided movably toward and away from said fixed bending jig, said holder having a passage extending in said longitudinal direction for holding said work therein and permitting passing of said work therethrough, wherein said work is partially projected from an outlet of said passage and is pressed against said fixed bending jig by moving said holder, thereby effecting bending of said work;

a work feeding device for intermittently feeding said work to project said work from said outlet of said passage of said holder; and a pair of cutting members opposed to each other for cutting said work across the thickness thereof with said work interposed between said cutting members, said cutting members being mounted on said movable base so as to be offset from said first and second jigs and located downstream of said first and second jigs in respect of said longitudinal directions of said work, said actuator moving said movable base to select one of said first position, said second position, or a third position where said cutting members are opposed to both surfaces of said work.

13. An automatic bending apparatus for bending a band-shaped work adapted to be fed in a longitudinal direction of said work thereof, comprising:

a movable work holder:

a fixed bending jig removably provided so as to be opposed to a side surface of said work, wherein said fixed bending jig has a hollow structure comprising a fixed portion and a bending portion adapted to abut against said side surface of said work to define an opening between said fixed portion and said bending portion, whereby a previously bent portion of said work comes into said opening in the course of approach of said movable work holder to said jig, thereby preventing interference between said work and said jig;

said movable work holder provided movably toward and away from said fixed bending jig, said holder having a passage extending in said longitudinal direction for holding said work therein and permitting passing of said work therethrough, wherein said work is partially projected from an outlet of said passage, presented on a side of said bending portion opposite said opening in said fixed bending jig, and pressed against said side of said bending portion of said jig by moving said holder, thereby effecting bending of said work; and a work feeding device for intermittently feeding said work to project said work from said outlet of said passage of said holder.

* * * * *